United States Patent [19]

Giles, Jr. et al.

[11] Patent Number: 5,070,142

[45] Date of Patent: Dec. 3, 1991

[54] POLYETHERIMIDE-ASA BLENDS

[75] Inventors: Harold F. Giles, Jr., Cheshire; William R. Schlich, Pittsfield, both of Mass.

[73] Assignee: General Electric Company, Pittsfield, Mass.

[21] Appl. No.: 948,069

[22] Filed: Dec. 31, 1986

[51] Int. Cl.$^5$ ............................................. C08L 79/08
[52] U.S. Cl. ..................................... 525/66; 525/179; 525/183; 525/184
[58] Field of Search .................. 525/179, 183, 184, 66

[56] References Cited

U.S. PATENT DOCUMENTS

| | | | |
|---|---|---|---|
| 3,847,310 | 5/1974 | Turczyk | 264/211 |
| 3,847,867 | 11/1974 | Heath et al. | 260/47 CP |
| 3,847,869 | 11/1974 | Williams | 260/47 CZ |
| 3,850,885 | 11/1974 | Takekoshi et al. | 260/47 CZ |
| 3,852,242 | 12/1974 | White | 260/47 CZ |
| 3,855,178 | 12/1974 | White et al. | 260/45.7 S |
| 3,944,631 | 3/1976 | Yu et al. | 260/881 |
| 4,329,310 | 5/1982 | Turczyk | 264/211 |
| 4,393,168 | 7/1983 | Giles et al. | 525/66 |
| 4,395,518 | 7/1983 | Giles et al. | 525/183 |
| 4,417,044 | 11/1983 | Parekh | 528/179 |

FOREIGN PATENT DOCUMENTS

| | | |
|---|---|---|
| 186243 | 7/1986 | European Pat. Off. |
| 257010 | 3/1970 | U.S.S.R. |
| 8403895 | 10/1984 | World Int. Prop. O. |

OTHER PUBLICATIONS

Koton, M. M. and Florinski, F. S., *Zh, Org. Khin.*, 4(5):774 (1968).

*Primary Examiner*—Ana L. Carrillo
*Attorney, Agent, or Firm*—Rothwell, Figg, Ernst & Kurz

[57] ABSTRACT

Disclosed are blends of (a) a polyetherimide and (b) a (meth) acrylate-styrene-acrylonitile polymer (ASA). The blends exhibit an improved heat distortion temperature flexural properties and tensile properties over the ASA component alone and have lower impact strengths than that associated with the ASA polymer alone.

10 Claims, No Drawings

POLYETHERIMIDE-ASA BLENDS

This invention relates to a class of polymer blends containing a polyetherimide and an acrylate-styrene-acrylonitrile polymer (ASA). The blends exhibit improved heat distortion temperatures, flexural properties and tensile properties over the ASA component alone and have higher impact strengths than the polyetherimide component of the blends.

The blends of the invention include a polyetherimide of the formula:

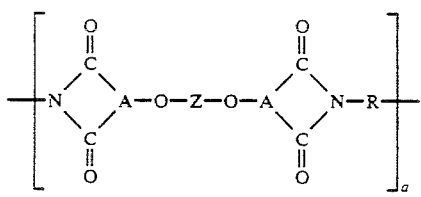

where "a" represents a whole number in excess of 1, i.e., 10 to 10,000 or more, the group —O—A< is selected from:

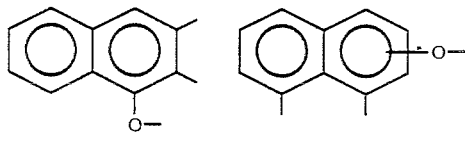

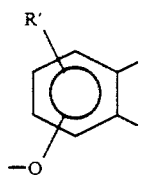

wherein R' is hydrogen, lower alkyl or lower alkoxy. Preferably the polyetherimide includes the latter —O—A< group where R' is hydrogen such that the polyetherimide is of the formula:

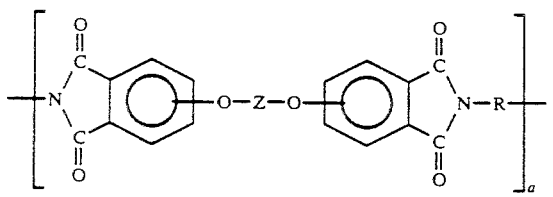

and the divalent bonds of the —O—Z—O— radical are in the 3,3'; 3,4'; 4,3' or the 4,4' position; Z is a member of the class consisting of (1) and

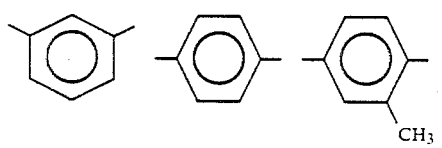

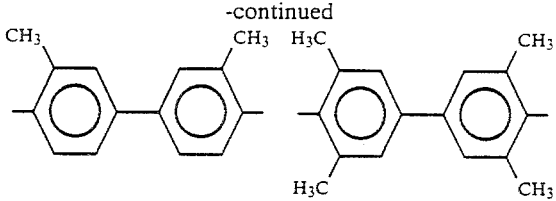

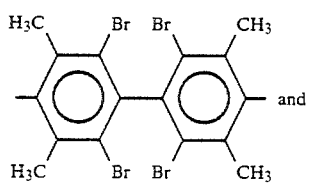

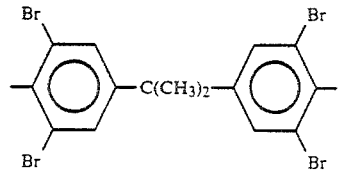

(2) divalent organic radicals of the general formula:

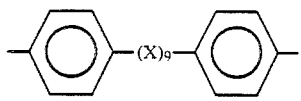

where X is a member selected from the class consisting of divalent radicals of the formulas,

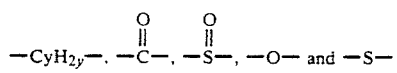

where q is 0 or 1, y is a whole number from 1 to 5; and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2-20 carbon atoms, $C_{(2-8)}$ alkylene terminated polydiorganosiloxanes, and (3) divalent radicals included by the formula

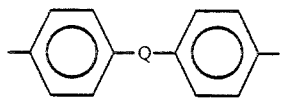

where Q is a member selected from the class consisting of

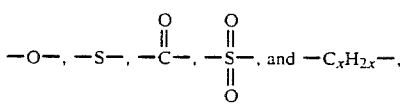

and x is a whole number from 1 to 5 inclusive. Particularly preferred polyetherimides for the purposes of the present invention include those where —O—A< and Z respectively are:

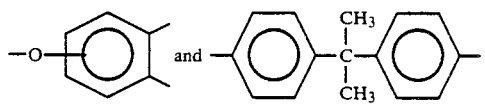

and R is selected from;

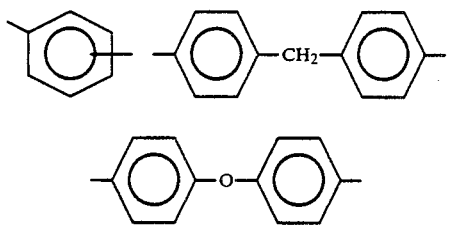

The polyetherimides where R is metaphenylene are most preferred.

The ASA polymers for use in the blends of the present invention are described in U.S. Pat. No. 3,944,631 to A. J. Yu et al. which is incorporated herein in its entirety by reference for the purpose of teaching, by way of illustration, general and specific methods for preparing ASA polymers suitable for the blends of this invention. The ASA polymer is made by a three-step sequence comprising emulsion polymerizing of an alkyl acrylate containing at least one crosslinking monomer, emulsion polymerizing a monomer mixture of styrene, acrylonitrile and at least one crosslinking monomer in the presence of the crosslinked acrylate elastomer formed in the previous step, or a reverse sequence of the prior two emulsion polymerization procedures, and, finally, emulsion or suspension polymerizing of styrene, acrylonitrile in the presence of the previously formed product.

Typical physical properties of ASA polymers include heat deflection values from about 180 to about 220° F. at 264 psi, tensile strengths from about 5,900 to 9,600 psi and notched Izod impact strengths of up to 11 ft.-lb./in. ASA polymers are known for their high resistance to fats, greases, salt solutions, dilute acids and bases.

The ASA polymers are formed by the following three-step, sequential polymerization process. The first step is the emulsion polymerization of a monomer charge (herein designated "(meth)acrylate", for the purposes of the present invention), of at least one $C_2$-$C_{10}$ alkyl acrylate, $C_8$-$C_{22}$ alkyl acrylate, $C_8$-$C_{22}$ alkyl methacrylate or compatible mixtures thereof, in an aqueous polymerization medium in the presence of an effective amount of a suitable di-or polyethylenically unsaturated crosslinking agent for such a type of monomer. The $C_4$-$C_8$ alkyl acrylates are the preferred (meth)acrylate monomers for use in this first step.

The second step is the emulsion polymerization of a monomer charge of styrene and acrylonitrile in an aqueous polymerization medium, also in the presence of an effective amount of a suitable di- or polyethylenically unsaturated crosslinking agent for such monomers This emulsion polymerization is carried out in the presence of the product from Step 1 so that the crosslinked (meth)acrylate and crosslinked styrene-acrylonitrile components form an interpolymer wherein the respective phases surround and penetrate one another.

The third step is either emulsion or suspension polymerization of a monomer charge of styrene and acrylonitrile, in the absence of a crosslinking agent and in the presence of the product resulting from Step 2. If desired, Steps 1 and 2 can be reversed in the above-described procedure.

The ASA polymer which is one component in the blends of the present invention generally comprises from about 5% to about 50%, by weight, of the above-identified crosslinked (meth)acrylate component, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer components and the crosslinked (meth)acrylate polymeric component.

In order to crosslink the (meth)acrylate monomers in Step 1 and the monomer charge of styrene and acrylonitrile in Step 2, about 0.05% to about 10% by weight based on the weight of the monomer, of at least one crosslinking agent is used. The crosslinking is a di- or polyfunctional ethylenically unsaturated monomer having at least one vinyl group. As is known in the art the vinyl groups on the crosslinking monomer can be the same or different. Examples of suitable crosslinking agents including divinyl benzene, trimethyol propane triacrylate, allyl methacrylate, diallyl fumarate, diallyl maleate, 1,3-butylene dimethacrylate, diethylene glycol dimethacrylate, ethylene glycol dimethacrylate, trimethylol-propane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetraacrylate ester of pentaerythritol and various diallyl phosphonates.

The emulsifiers which are used can be of conventional types including an anionic emulsifier, e.g., the $C_2$-$C_{22}$ carboxylic acids, the sulfates or sulfonates of $C_6$-$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifiers should be present from about 0.5% to about 5% by weight in the emulsion.

To initiate the polymerization of the monomers in each step, conventional initiators are present in the monomer mixtures in an amount ranging from about 0.005% to 2% by weight of the acrylate monomer. Suitable for use are water-soluble peroxidic compounds, e.g., hydrogen peroxide and alkali metal and ammonium persulfates, oil soluble organic peroxides and azo compounds, e.g. benzoyl peroxide, azobisisobutyronitrile and the like used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used.

When suspension polymerization is used for the third step, the suspending agent can be methyl cellulose, hydroxyethyl cellulose, hydroxypropyl cellulose, carboxymethyl cellulose, talc, clay, polyvinyl alcohol, gelatine and the like. Hydroxypropyl methyl cellulose is the preferred suspending agent which should, preferably, have a viscosity of at least about 3,000 and, preferably, about 15,000 cps. as determined, at 20° C., with a 2%, by weight, aqueous solution of the polymer in a Ubbelohde viscometer according to ASTM Procedures D-1347-64 and D-2363-65T.

A number of commercially available ASA polymers may be used in forming the blends of the present invention. One example is the Geloy ® resins which are available from General Electric Company, Plastics Group, Geloy Products Section, Selkirk, New York 12158. Another ASA polymer that is suitable for use in the present invention is the Vitax ® resins which are commercially available from Hitachi Chemical Company of Tokyo, Japan.

The polyetherimides that are used to form the novel blends can be obtained by any of the methods well known to those skilled in the art including the reaction of any aromatic bis(ether anhydrides) of the formula

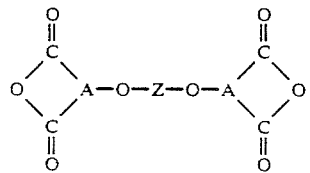

where A and Z are as defined hereinbefore, with an organic diamine of the formula

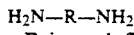

$H_2N-R-NH_2$ where R is as defined hereinbefore. Aromatic bis(ether anhydrides)s of the above formula include, for example, 2,2-bis[4-(2,3-dicarboxyphenoxy)-phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3 dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy) -diphenyl-2,2-propane dianhydride; and mixtures of such dianhydrides.

In addition, aromatic bis(ether anhydride)s also included by the above formula are shown by Koton, M. M.; Florinski, F. S.; Bessonov, M. I.;1 Rudakov, A. P. (Institute of Heteroorganic Compounds, Academy of Sciences, U.S.S.R.), U.S.S.R. 257,010, Nov. 11, 1969, Appl. May 3, 1967. Also, dianhydrides are shown by M. N. Koton, F. S. Florinski, Zh Org. Khin, 4(5), 774 (1968).

Organic diamines of the above formula include, for example, m-phenylenediamine, p-phenylenediamine, 4,4'-diaminodiphenyl propane, 4,4'-diaminodiphenylmethane, benzidine, 4,4'-diaminodiphenyl sulfide, 4,4'-diaminodiphenylsulfone, 4,4'-diaminodiphenyl ether, 1,5-diaminonaphthalene, 3,3'-dimethylbenzidine, 3,3'-dimethoxybenzidine, 2,4-bis(β-amino-t-butyl)-toluene, bis(p-β-amino-t-butylphenyl)ether, bis(p-β-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like, and mixtures of such diamines.

In general, the reactions can be advantageously carried out employing well-known solvents, e.g., o-dichlorobenezne, m-cresol/toluene, etc. at temperatures of from about 100° to about 250° C. Alternatively, the polyetherimides can be prepared by melt polymerization of any of the aforementioned compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily used in melt polymerization can be employed. The conditions of the reaction and the proportions of ingredients can be varied widely depending on the desired molecular weight, intrinsic viscosity, and solvent resistance., In general, equimolar amounts of diamine and dianhydride are employed for high molecular weight polyetherimides, however, in certain instances, a slight molar excess (about 1 to 5 mole percent) of diamine can be employed resulting in the production of polyetherimides having terminal amino groups. Preferably, the polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al. 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the blends of this invention.

In accordance with the present invention, blends of a polyetherimide and an ASA polymer are generally obtainable in varying proportions of the polymers relative to each other. However, if the ASA polymer component exceeds 90 percent by weight of the binary blend further containing a polyetherimide, the blend may contain undesireable particles of undissolved polyetherimide. On the other hand, if the binary blend contains in excess of 90 percent by weight of a polyetherimide, the blend may tend to delaminate upon injection molding. Therefore, the polyetherimide and ASA polymer components of the blend may be mixed in weight ratios of 10:90 to 90:10 relative to each other. Preferably, the polyetherimide-ASA polymer blend comprises from about 75 to about 25 weight percent of polyetherimide and from about 25 to about 75 weight percent of the ASA polymer By controlling the proportions of the components of the blend relative to each other, blends having certain predetermined useful properties which are improved over those of certain components alone may be readily obtained In general, blends of the subject invention may exhibit depending on the blend ratio of the components, one or more of the properties of high tensile and/or flexural strengths, good impact strengths and high heat distortion temperatures.

It is contemplated that the blends of the present invention may also include other additive materials such as fillers, stabilizers, plasticizers, flexibilizers, surfactant agents, pigments, dyes, reinforcement, flame retardants and diluents in conventional amounts. It is also contemplated that the blends of the invention may include two or more polyetherimides in combination with one or more liquid crystal polymers or two or more liquid crystal polymers in combination with one or more polyetherimides.

Methods for forming blends of the present invention may vary considerably. Prior art blending techniques are generally satisfactory. A preferred method comprises blending the polymers and additives such as reinforcements in powder, granular or filamenous form, extruding the blend, and chopping the extrudate into pellets suitable for molding by means conventionally used to mold normally solid thermoplastic compositions.

The subject blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated tempratures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric, capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Other applications which are contemplated for these blends include their use as binders for asbestos fibers, carbon fibers, and other fibrous materials in making brake linings. In addition, molding compositions and molded articles may be formed form the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific polyetherimide-ASA polymer blends in accordance with the present invention. It should be understood that the examples are given for the purpose of illustration and do not limit the invention. In the examples, all parts and percentages are by weight unless otherwise specified.

EXAMPLES 1–7

A series of blends of a polyetherimide resin (Ultem ® 1000 from General Electric) and an ASA polymer (Geloy ® 1020 from General Electric) were extruded in a 28 mm Werner Pfleiderer twin screw extruder. The extrudate was chopped into pellets and injection molded with a mold temperature of 200 to 205° F. The molded specimens were then evaluated to determine standard mechanical properties.

The tables below list the proportions of each component of the blend as well as the resulting properties for each blend. The flexural data was determined from tests based on ASTM Method D-790. The tensile data was based on ASTM Method D-638. Gardner Impact data was based on ASTM Method D-3029.

| Extrudate Sample | % Polyether-imide | % ASA | Notched Izod impact 0.125" bar ft lbs/in$^2$ (joules) | HDT° C. at 264 psi | Garnder Impact (joules) .125" plaque |
|---|---|---|---|---|---|
| 1 | 0 | 100 | 5.2 (278) | 76 | >36.2 |
| 2 | 10 | 90 | 2.7 (144) | 86 | 1.9 |
| 3 | 30 | 70 | 1.0 (53) | 88 | 1.0 |
| 4 | 50 | 50 | 0.8 (42.7) | 101 | >1.0 |
| 5 | 70 | 30 | 0.6 (32.0) | 126 | >1.0 |
| 6 | 90 | 10 | 1.6 (85) | 175 | 1.4 |
| 7 | 100 | 0 | 0.7 (38) | 188 | 4.4 |

| | Flexural Properties (0.32 cm bar) | | | |
|---|---|---|---|---|
| Extrudate Sample | Initial Mod. PSI × 10$^5$ (GPa) | Strength at 5% Strain PSI × 10$^3$ (MPa) | Ultimate Strength PSI × 10$^3$ (MPa) | Strain at Ultimate Stress % |
| 1 | 2.53 (1.74) | 8.18 (56.4) | 8.19 (56.5) | 5.0 |
| 2 | 2.48 (1.71) | 8.09 (55.7) | 8.11 (55.9) | 5.0 |
| 3 | 2.85 (1.96) | 8.92 (61.5) | 8.96 (61.8) | 5.2 |
| 4 | 3.43 (2.36) | — | 11.8 (81.1) | 4.7 |
| 5 | 3.92 (2.70) | — | 11.2 (7.72) | 3.5 |
| 6 | 4.42 (3.05) | 14.9 (103) | 16.2 (111) | 7.0 |
| 7 | 4.87 (3.35) | 20.3 (140) | 25.2 (160) | 7.3 |

| | Tensile Properties | | | | |
|---|---|---|---|---|---|
| | Modulus | Yield | | Failure | |
| Extrudate Sample | PSI × 10$^5$ (GPa) | PSI × 10$^3$ (MPa) | % | PSI × 10$^3$ (MPa) | % |
| 1 | 2.43 (1.67) | 5.39 (37.2) | 3.4 | 4.07 (28.0) | 19 |
| 2 | 2.33 (1.61) | 4.64 (32.0) | 3.1 | 4.21 (29.0) | 5.1 |
| 3 | 2.65 (1.82) | 4.83 (33.3) | 4.2 | 4.78 (32.9) | 6.0 |
| 4 | 3.11 (2.14) | 7.57 (52.2) | 4.7 | 7.57 (52.2) | 4.9 |
| 5 | 3.46 (2.39) | 8.92 (61.5) | 4.3 | 8.92 (61.5) | 4.3 |
| 6 | 4.04 (2.78) | 11.9 (82.0) | 5.0 | 11.1 (76.5) | 5.9 |
| 7 | 4.37 (3.01) | 16.1 (111) | 6.6 | 12.6 (86.9) | — |

EXAMPLES 8–12

Another series of blends of a polyetherimide and an ASA polymer (Vitax ® 6100 from Hitachi Chemical Co.) were extruded and molded into test specimens in accordance with Examples 2–6.

The tables below list the proportions of each component of the blend as well as the resulting properties.

| Extrudate | % Polyether- | Notched Izod impact (0.125" bar) (joules) | HDT° C. at 264 |
|---|---|---|---|

-continued

| Sample | % imide | % ASA | ft lbs/in² | psi |
|---|---|---|---|---|
| 8 | 95 | 5 | 1.0 (53) | 178 |
| 9 | 90 | 10 | — | 180 |
| 10 | 70 | 30 | 0.5 (27) | 149 |
| 11 | 50 | 50 | 0.4 (21) | 102 |
| 12 | 30 | 70 | 0.4 (21) | 92 |

| | Flexural Properties (0.32 cm bar) | | | |
|---|---|---|---|---|
| Extrudate Sample | Initial Mod. PSI × 10⁵ (GPa) | Strength at 5% Strain PSI × 10⁴ (MPa) | Ultimate Strength PSI × 10⁴ (MPa) | Strain at Ultimate Stress % |
| 8 | 4.98 (3.43) | 2.02 (13.9) | 2.26 (155) | 7.5 |
| 9 | 4.81 (3.31) | 1.76 (121) | 1.96 (135) | 7.8 |
| 10 | 4.59 (3.16) | — | 1.51 (104) | 4.0 |
| 11 | 4.26 (2.93) | 1.44 (99) | 1.49 (102) | 6.1 |
| 12 | 4.10 (2.82) | — | 1.07 (74) | 9.8 |

| | Tensile Properties | | | |
|---|---|---|---|---|
| | Modulus | Yield | | Failure |
| Extrudate Sample | PSI × 10⁵ (GPa) | PSI × 10⁴ (MPa) | % | PSI × 10⁴ (MPa) | % |
| 8 | 4.54 (3.13) | 1.53 (105) | 6.9 | 1.19 (82) | 12 |
| 9 | 4.57 (3.15) | 1.27 (88) | 5.6 | 0.807 (56) | 7.0 |
| 10 | 4.60 (3.17) | — | — | 1.01 (69) | 4.5 |
| 11 | 3.92 (2.70) | — | — | 0.813 (56) | 5.3 |
| 12 | 3.66 (2.52) | — | — | 0.488 (33.6) | 9.1 |

EXAMPLE 13-17

Another series of polyetherimide blends were prepared and test specimens made in a manner similar to Examples 2-6 except the ASA was Vitax 6001 resin from Hitachi Chemical Co.

The tables below list the properties of each component of the blend as well as the resulting properties.

| Extrudate Sample | % Polyetherimide | % ASA | Notched Izod impact (0.125" bar) (joules) ft lbs/in² | HDT° C. at 264 psi |
|---|---|---|---|---|
| 13 | 90 | 5 | 1.2 (64) | 176 |
| 14 | 90 | 10 | — | 177 |
| 15 | 70 | 30 | 1.9 (101) | 160 |
| 16 | 50 | 50 | 1.2 (64) | 101 |
| 17 | 30 | 70 | 1.3 (69) | 91 |

| | Flexural Properties (0.32 cm bar) | | | |
|---|---|---|---|---|
| Extrudate Sample | Initial Mod. PSI × 10⁵ (GPa) | Strength at 5% Strain PSI × 10⁴ (MPa) | Ultimate Strength PSI × 10⁴ (MPa) | Strain at Ultimate Stress % |
| 13 | 4.73 (3.26) | 1.94 (133) | 2.18 (150) | 7.5 |
| 14 | 4.54 (3.13) | 1.50 (103) | 1.84 (127) | 7.7 |
| 15 | 3.88 (2.67) | 1.34 (92) | 1.34 (92) | 4.9 |
| 16 | 3.27 (2.25) | 1.11 (76) | 1.16 (80) | 6.1 |
| 17 | 2.58 (1.77) | 0.833 (57) | 0.854 (59) | 6.5 |

| | Tensile Properties | | | | |
|---|---|---|---|---|---|
| | Modulus | Yield | | Failure | |
| Extrudate Sample | PSI × 10⁵ (GPa) | PSI × 10⁴ (MPa) | % | PSI × 10⁴ (MPa) | % |
| 13 | 4.62 (3.18) | 1.51 (164) | 6.9 | 1.20 (83) | 1.0 |
| 14 | 4.21 (2.90) | 1.19 (82) | 6.4 | 0.968 (68) | 7.7 |
| 15 | 3.66 (2.52) | 0.880 (61) | 3.9 | 0.814 (56) | — |
| 16 | 2.98 (2.05) | 0.714 (49) | 5.9 | 0.658 (45) | — |
| 17 | 2.54 (1.75) | — | — | 0.532 (37) | 11.7 |

While the present invention has been described with reference to particular embodiments thereof, it will be understood that numerous modifications may be made by those skilled in the art without actually departing from the spirit and scope of the invention as defined in the appended claims.

We claim:

1. A polymeric blend comprising (a) a polyetherimide and (b) (meth)acrylate-styrene-acrylonitile polymer wherein said polymer is from about 5% to about 50% by weight crosslinked (meth)acrylate component, from about 5% to about 35% by weight of a crosslinked styrene-acrylonitile component and from about 15% to about 90% by weight uncrosslinked styrene-acrylonitile component.

2. A composition in accordance with claim 1, wherein the polyetherimide has the formula:

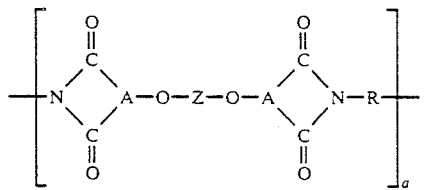

where a represents a whole number in excess of 1, the group —O—A< is selected from:

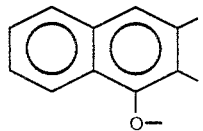 , 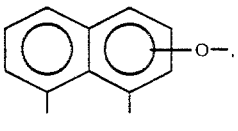

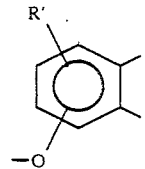

R' being hydrogen, lower alkyl or lower alkoxy, and Z is a member of the class consisting of (1)

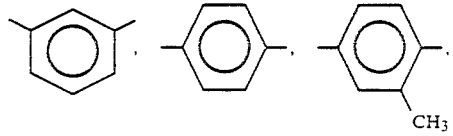

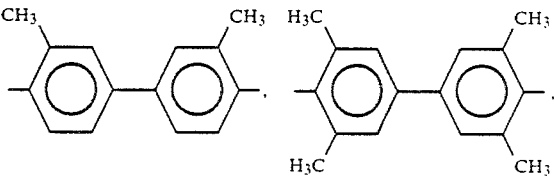

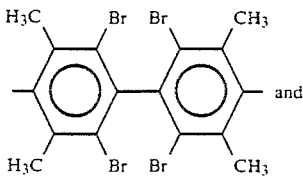 and

-continued

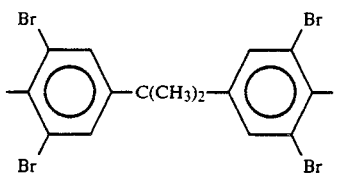

and (2) divalent organic radicals of the general formula:

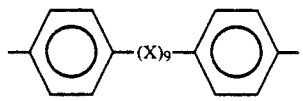

where X is a member selected from the class consisting of divalent radicals of the formulas,

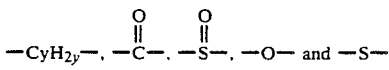

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2-20 carbon atoms, $C_{(2-8)}$ alkylene terminated polydiorganosioloxanes, and (3) divalent radicals included by the formula

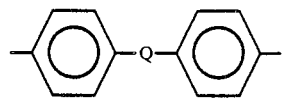

where Q is a member selected from the class consisting of

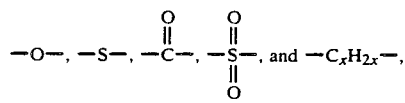

and x is a whole number from 1 to 5 inclusive.

3. A composition in accordance with claim 2 wherein the polyetherimide is of the formula:

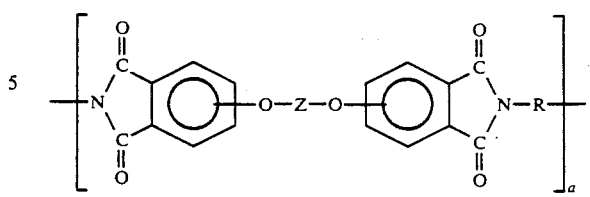

and the divalent bonds of the —O—Z—O— radicals are in the 3,3'; 3,4'; 4,3' or the 4,4' position.

4. A composition in accordance with claim 3, wherein Z is;

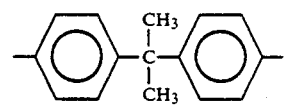

and R is selected from;

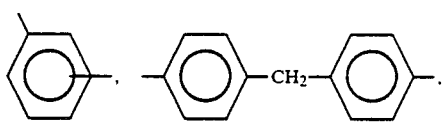

or

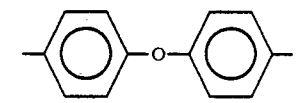

5. A composition in accordance with claim 4, wherein the polyetherimide is of the formula;

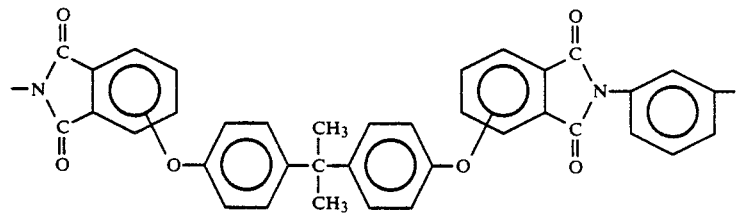

6. A composition in accordance with claim 1 wherein the (meth)acrylate component of the methacrylate-styrene-acrylonitile polymer is selected from the group consisting of the crosslinked $C_2$-$C_{10}$ alkyl acrylates, the crosslinked $C_8$-$C_{22}$ alkyl methacrylates and compatible mixtures thereof.

7. A composition in accordance with claim 6 wherein the (meth)acrylate component of the (meth)acrylate-styrene-acrylonitile polymer is a crosslinked $C_4$-$C_8$ alkyl acrylate.

8. A composition in accordance with claim 1 wherein the composition is from about 10% to about 90% percent by weight of polyetherimide and from about 10% to about 90% percent by weight of a (meth)acrylate -styrene-acrylonitrile polymer.

9. A composition in accordance with claim 8, wherein the composition is from about 25% to about 75% by weight of polyetherimide and from about 25% to about 75% by weight of a meth(acrylate)-styrene-acrylonitrile polymer.

10. A polymeric blend comprising (a) a polyetherimide and (b) an acrylate-styrene-acrylonitile polymer wherein said polymer being formed by a process which comprises:
1. formation of a composition which comprises a crosslinked acrylate elastomer and a crosslinked styrene-acrylonitrile polymer by:
   a i. emulsion polymerization of at least one alkyl acrylate in the presence of at least one crosslinking agent; and
   a ii. emulsion polymerization of styrene, acrylonitrile, and at least one crosslinking agent in the presence of the reaction product of step 1 a i. or
   b i. emulsion polymerization of styrene and acrylonitrile in the presence of at least one crosslinking agent and
   b ii. emulsion polymerization of at least one alkyl acrylate and at least one crosslinking agent in the presence of the reaction product of step 1 b i; and
2. either suspension or emulsion polymerication of styrene and acrylonitrile in the absence of a crosslinking agent in the presence of the composition of Step 1.

* * * * *

UNITED STATES PATENT AND TRADEMARK OFFICE
CERTIFICATE OF CORRECTION

PATENT NO. : 5,070,142

DATED : December 3, 1991

INVENTOR(S) : Harold F. Giles, Jr. et al.

It is certified that error appears in the above-identified patent and that said Letters Patent is hereby corrected as shown below:

Item [56]
On the cover, in the references, delete "3,847,310".

Signed and Sealed this

Eleventh Day of January, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,070,142
DATED : 12/3/91
INVENTOR(S) : Harold F. Giles Jr., et al

It is certified that error appears in the above-indentified patent and that said Letters Patent is hereby corrected as shown below:

In Column 2, line 30
please change the structure

"  "

to the structure

-- 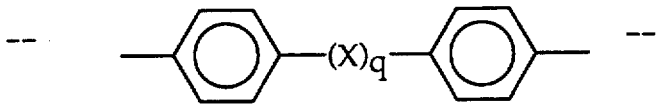 --

Signed and Sealed this

Thirtieth Day of August, 1994

Attest:

BRUCE LEHMAN

*Attesting Officer*     *Commissioner of Patents and Trademarks*